April 2, 1968  W. V. STURM  3,375,742
TURRET MECHANISM
Filed June 22, 1966  2 Sheets-Sheet 1

INVENTOR.
WALTER V. STURM
BY Woodling, Krost, Granger and Rust
ATTORNEYS

INVENTOR.
WALTER V. STURM
BY Woodling, Krost,
George and Rust
ATTORNEYS

United States Patent Office 3,375,742
Patented Apr. 2, 1968

3,375,742
TURRET MECHANISM
Walter V. Sturm, Sidney, Ohio, assignor to The Monarch Machine Tool Company, a corporation of Ohio
Filed June 22, 1966, Ser. No. 559,451
10 Claims. (Cl. 82—36)

The invention relates in general to a turret mechanism and more particularly to an improved turret toolholder mechanism for use with machine tools.

The typical toolholder turret used with machine tools has had means to clamp the toolholder into the turret and separate means to accurately locate the tool mounted on the toolholder with respect to the longitudinal axis of the toolholder bore in the turret. This is done so that each succesive tool being moved into the operative position by the indexing turret will always be in a definite reference plane for proper cutting angle of the tool relative to a workpiece on the machine tool. Also the prior art machine tools have had many different forms of providing coolant to the tools but generally these have included cumbersome exposed piping flexible to some degree to permit the coolant to be directed toward the tool cutting the workpiece. This is often costly in downtime and resharpening of tools when misdirected and requires manual resetting of the piping as the cutting of the workpiece progresses or the tools are changed by the turret thus defeating the continued trend toward automating the various cutting cycles of the machine tool.

Accordingly an object of the invention is to obviate the above-mentioned disadvantages.

Another object of the invention is to provide a turret mechanism with a single means for fastening the toolholder into the turret and for locating the turret so that a tool mounted thereon is in a reference plane.

Another object of the invention is to provide a turret mechanism wherein the coolant is primarily concealed and is definitely directed to the cutting tool at the cutting point.

Another object of the invention is to provide a turret mechanism wherein a toolholder is closely received in a bore in the turret and a single surface on the toolholder provides both axial and rotative locking of the toolholder in the turret.

Another object of the invention is to provide a turret mechanism wherein a toolholder is closely received in a bore in the turret and a single surface on the toolholder provides both axial and rotative locking of the toolholder in the turret.

Another object of the invention is to provide a turret mechanism with coolant valving means to supply coolant only to a turret toolholder in an operative position with respect to the workpiece being cut.

Another object of the invention is to provide a turret mechanism wherein a binder plug is provided to both lock the toolholder in place and to rotatively position the toolholder to maintain the tool in a reference or cutting plane.

Another object of the invention is to provide a turret mechanism with coolant means such that as the toolholder is inserted into a bore of the turret, the coolant passages are all automatically connected to provide coolant to the cutting tool surface.

The invention may be incorporated in a turret mechanism, comprising, in combination, a base, means journaling a turret on said base on a first axis, a toolholder bore circular in cross section in said turret lying in a plane at an angle to said axis, a face on said turret generally parallel to said toolholder bore, a locking aperture in said turret, said locking aperture extending at an angle to the axis of said toolholder bore and extending from said face of the turret to intersect said toolholder bore but axially offset therefrom, a binder plug in said locking aperture, said binder plug having a second axis and having a binder face disposed at an acute angle to said second axis, a toolholder having an extension adapted to be received in said toolholder bore, a wedging face on said toolholder extension and having a component parallel to the axis thereof, said binder face adapted to engage said wedging face on said toolholder extension upon the toolholder being inserted in said toolholder bore, said binder face and said wedging face being complementary for interengagement throughout an area of substantial size relative to said toolholder bore, and means engaging said turret and said binder plug to fasten said binder plug to said turret generally in a direction along said second axis to cause said binder face on said binder plug to positively engage said wedging face on said toolholder extension to thus firmly lock said toolholder extension axially in said toolholder bore of the turret and also to positively rotatively locate the toolholder extension in said toolholder bore.

Other objects and a fuller understanding of the invention may be had by referring to the following description and claims, taken in conjunction with the accompanying drawings, in which:

Figure 1:
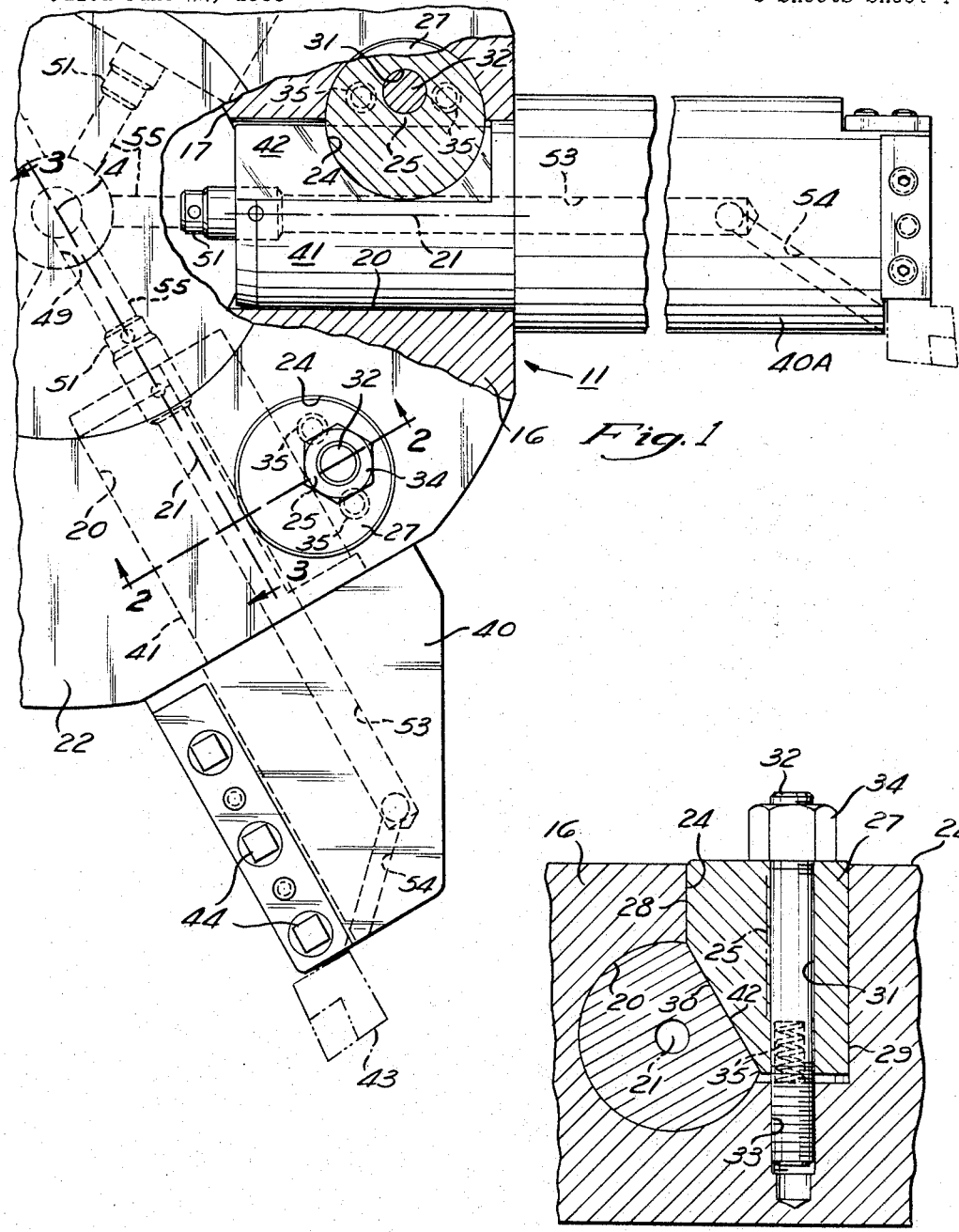
FIGURE 1 is a plan view of a turret mechanism embodying the invention.

The invention may be incorporated in a turret mechanism 11 for a machine tool indicated generally by a saddle or base 12 which may be slidable on ways of the machine tool toward and from a headstock, not shown. The base 12 has an axis 14. A turret 16 is journalled on bearings 18 on the base 12. The turret 16 has an inner cylindrical periphery 17 meeting with a cylindrical periphery 13 of a central rotating member 15.

The turret 16 has a plurality of toolholder bores 20 each of which has an axis 21 extending at an angle to the first axis 14. In this turret mechanism shown, the axes 21 lie in a common plane perpendicular to the first axis 14. Also the axes 21 are radial from the first axis 14. A top face 22 is provided on the turret 16 and from this top face a plurality of locking bores or apertures 24 extends into the turret 16. Preferably there is one locking bore for each toolholder bore. Each locking bore 23 has an axis 25 which is axially offset from the axis 21 of the respective toolholder bore. Preferably this locking bore axis 25 is normal to the common plane of all of the toolholder bore axes 21. The locking bores are partially offset from the respective toolholder bores but still intersect a portion thereof.

A binder plug 27 is provided for each locking bore 24. Each binder plug has an axis coinciding with the axis 25 of the respective locking bore. Each binder plug has a first portion 28 which is cylindrical and closely received within the respective locking bore. Also each binder plug has a second portion 29 part of which is a cylindrical extension of the first portion 27 and another part of which is a binder face 30. A lengthwise bore 31 is provided in each binder plug 27. A stud 32 is threaded into an aperture 33 in the turret 16 and this stud is received in the lengthwise bore 31. A nut 34 may be threaded onto the stud 32 at the top of the binder plug 27 to urge it downwardly. Springs 35 are provided in recessed bores 36 in the bottom of the binder plug 27 to urge the binder plug upwardly upon release of the nut 34.

A toolholder 40 may be provided for each toolholder bore 20. These toolholders 40 and 40A may be of several different types according to the type of cutting to be performed, such as drilling, reaming, tapping, face cutting, end cutting, cutoff and the like. Each such toolholder 40 and 40A has an inner extension 41 which is preferably cylindrical and is closely received within the respective toolholder bore 20. Each toolholder extension 41 is generally circular in cross section and preferably cylindrical to be closely received and closely aligned by the respective toolholder bore 20. This wedging face has a major component parallel to the respective axis 21 and preferably is a planar face parallel to the respective axis 21.

When a toolholder 40 is inserted into any one of the toolholder bores 20, the binder plug 27 will at that time be loosened by loosening the nut 34. The springs 35 will have moved the binder plug 27 upwardly a small amount so that the toolholder extension 41 may easily be inserted into the bore 20. When the nut 34 is tightened, this draws the binder plug 27 downwardly so that the binder face 30 will tightly engage the wedging face 42 on the toolholder extension 41. This will perform two different functions. First, it will axially lock the toolholder extension 41 into the bore 20. Second, it will rotatively lock the toolholder extension 41 in this bore 20 so that a tool 43 on the toolholder is definitely positioned in a reference cutting plane.

This tool 43 may be mounted by tool mounting means 44. This definitely assures that the cutting tool 43 will be at the proper position for cutting the workpiece in the headstock, not shown. In prior art constructions, it was customary to have two separate means, one for axially fastening the toolholder into the turret and another fastening means for rotatively or otherwise positioning the toolholder so that a tool thereon would be in the proper cutting plane. By the use of the wedging face 42 and binder face 30 on the binder plug 27, these two functions may be simply and efficiently performed by a single device.

The rotating member 15 carried with the saddle 16, houses a stationary central plug 48 stationary relative to the base or saddle 12. Coolant is supplied under pressure from a pump 46 through a central tube 47 which is stationary on the saddle 12. The central plug 48 has a single radial bore 49 directing the coolant in a radial direction toward an operation position, in this case toward the headstock of the machine tool, not shown. A plurality of radial bores 55, in this case six in number, are provided in the rotating member 15. Bores 50 directed upwardly conduct coolant to an inner end of a connector 51 on the inner end of each toolholder extension 41. The connector 51 makes a sealing connection with a seal 52 carried in the outer periphery of the rotating member 15. The connector 51 is coaxial with the toolholder bore axis 21. The connector 51 is in fluid communication with a bore 53 axially within the toolholders 40 and 40A. This bore 53 leads to another bore 54 at an angle to direct the coolant toward the cutting surface of the cutting tool 43.

Figure 3:
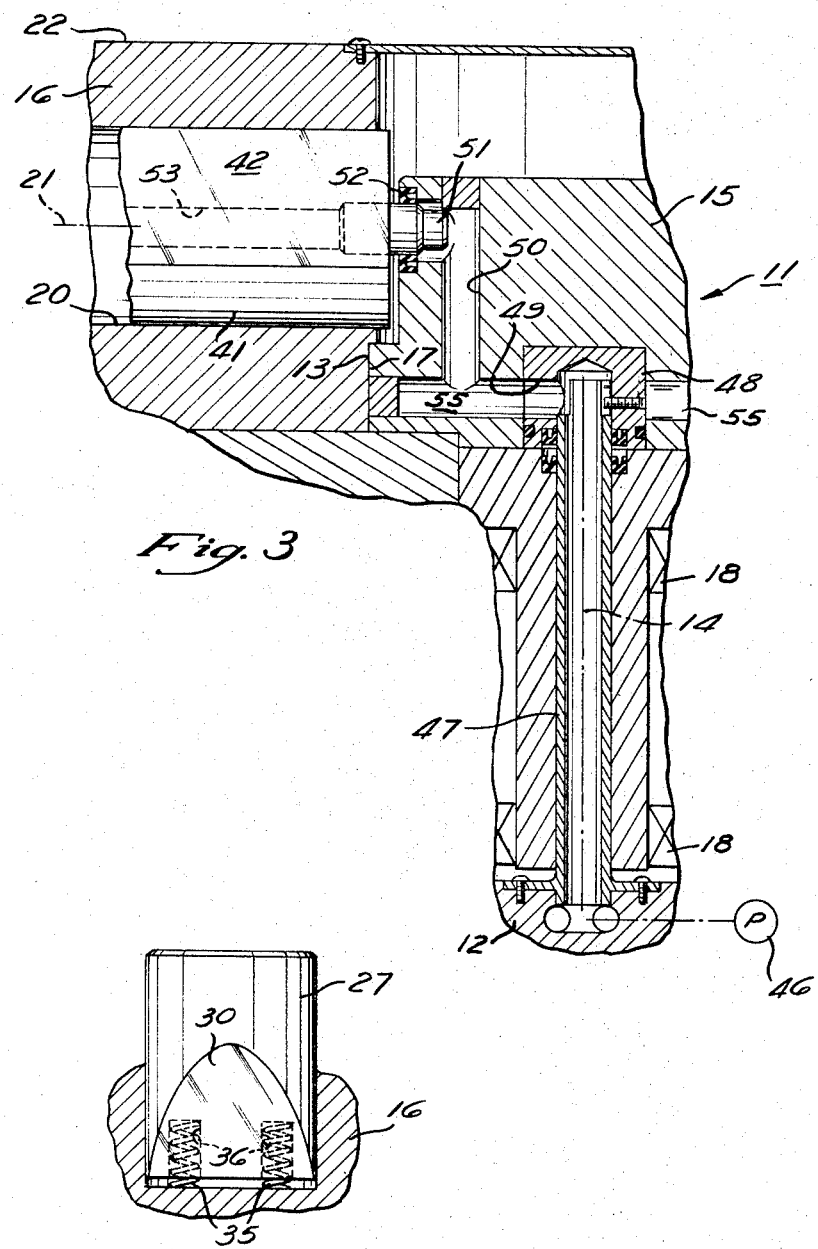
FIGURE 3 is a sectional view on line 3—3 of FIGURE 1.

As seen in FIGURES 1 and 3, the radial bore 49 is radially directed only toward a single operative position, in this case shown at about the five o'clock position which would be directed generally along the lengthwise axis of the machine tool toward the headstock, not shown. Accordingly as the turret 16 is indexed, only that toolholder 40 or 40A which is in the operative position, will be valved by bore 49 mating selectively with the respective radial bore 55 to have coolant flow thereto from the main central tube 47. Accordingly with the six sided turret shown, only one of the six tools in the turret would have coolant valved thereto and this would be the toolholder and tool directed toward and actually doing the cutting on the workpiece. Only two representative toolholders 40 and 40A have been shown, but it will be understood that many different forms of toolholders may be used for cutting, boring, facing, cutoff and the like with the coolant valved to each such tool as it is indexed into the operative position.

It will be noted that the binder plug 27 provides the dual function of locking the respective toolholder axially in place and also locking it rotatively in place so that the cutting tool 43 is in the cutting or reference plane. With this assurance of the proper rotative positioning of each tool holder 40, the individual tools 43 may be fastened in the toolholder by fastening or mounting means 44 with assurance that the cutting point or cutting surface of each tool 43 will be at the proper angle and planar position to properly cut the workpiece. Also with the coolant being properly conducted to a position very close to the cutting tool surface itself, there is no chance that flexible piping formerly used for coolant supply would be misdirected to thus improperly cool and lubricate the tool. Such improper coolant flow often overheated and quickly damaged the tool requiring downtime for resharpening the tool. In the present tool turret assembly, this is obviated because each tool and only the tool in the operative position receives properly directed coolant flow automatically as the turret is indexed.

Figure 2:
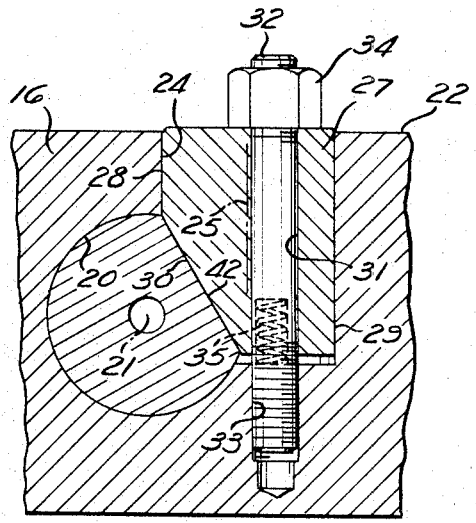
FIGURE 2 is a sectional view on line 2—2 of FIGURE 1.

The FIGURES 1 and 2 show the binder face 30 and wedging face 42 as being in complementary engagement. They may be curved surfaces but are shown as planar surfaces and such planar surfaces are preferred for accuracy in tolerance of manufacture so that any one of the toolholders 40 may fit in any one of the toolholder bores and be clamped in position with the tool 43 positioned in the reference cutting plane with a minimum of tolerance.

Figure 4:
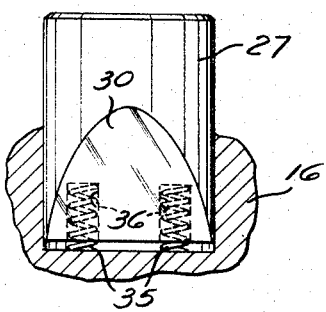
FIGURE 4 is an elevational view of a binder plug used in the invention.

The complementary surface engagement between the binder face 30 and wedging face 42 is of a substantial area, as observed in FIGURE 4 and this area is of substantial size relative to the diameter of the toolholder bore 20.

FIGURE 2 shows that the wedging face 42 on the toolholder extension 41 is a surface cutting off a portion of the cylindrical extension 41. As such, this planar wedging face 42 lies within the circular cross-section of extension 41 as viewed in FIGURE 2. This permits the toolholder 40 to be turned to any position in the absence of binder plug 27. Also this wedging face 42 forms a portion of the periphery of the cylindrical toolholder extension 41 at a substantial radius from the axis 21. This gives a long lever arm against which the binder face 30 may act to positively lock this toolholder 40 in place, both axially and rotatively.

The binder face 30 is at an acute angle relative to the binder plug axis 25 and preferably is in the range of between 16 and 30 degrees. It is shown as being about 30 degrees and the fact that it is in excess of 16 degrees assures that it is a self-releasing taper rather than a self-holding taper so that the compression springs 35 will slightly release the binder plug 27 to permit easy withdrawal or insertion of any of the toolholders 40.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A turret mechanism, comprising, in combination, a base,
 means journaling a turret on said base on a first axis,
 a toolholder bore circular in cross section in said turret lying in a plane at an angle to said axis,
 a face on said turret generally parallel to said toolholder bore,
 a locking aperture in said turret,
 said locking aperture extending at an angle to the axis of said toolholder bore and extending from said face of the turret to intersect said toolholder bore but axially offset therefrom,
 a binder plug in said locking aperture,
 said binder plug having a second axis and having a binder face disposed at an acute angle to said second axis, a toolholder having an extension adapted to be received in said toolholder bore, a wedging face on said toolholder extension and having a component parallel to the axis thereof, said binder face adapted to engage said wedging face on said toolholder extension upon the toolholder being inserted in said toolholder bore, said binder face and said wedging face being complementary for interengagement throughout an area of substantial size relative to said toolholder bore, and means engaging said turret and said binder plug to fasten said binder plug to said turret generally in a direction along said second axis to cause said binder face on said binder plug to positively engage said wedging face on said toolholder extension to thus firmly lock said toolholder extension axially in said toolholder bore of the turret and also to positively rotatively locate the toolholder extension in said toolholder bore.

2. A turret mechanism as defined in claim 1 including said toolholder extension being cylindrical, said wedging face being substantially parallel to the axis of said cylindrical extension, and said binder face being at an acute angle to said second axis and greater than a sixteen degree angle.

3. A turret mechanism as defined in claim 1 including said wedging face and said binder face being planar surfaces.

4. A turret mechanism as defined in claim 1 wherein said locking aperture extends generally at right angles to the axis of said toolholder bore, said wedging face being near the periphery of said toolholder extension, and the axis of said locking aperture is axially offset from the axis of the toolholder bore such that said binder face on said binder plug engages said wedging face on the toolholder extension.

5. A turret mechanism as defined in claim 1 wherein said means engaging said turret and said binder plug includes screw means extending generally longitudinally through said binder plug to engage a threaded aperture in said turret to thus force said binder plug in a direction along the longitudinal axis thereof toward said toolholder extension to cause said binder face and wedging face to positively interengage.

6. A turret mechanism as defined in claim 1 wherein said toolholder bore is cylindrical and said toolholder extension has a partially cylindrical surface closely received in said cylindrical bore and with said wedging face on said toolholder extension being a surface lying inside the cylinder defined by said cylindrical surface of said extension to be spaced from said cylindrical surface of said extension to be spaced from said cylindrical toolholder bore to thus permit rotation of said toolholder extension if the binder plug is not firmly in place.

7. A turret mechanism as defined in claim 1 including means to supply coolant to said base, means on said toolholder to mount a tool thereon, means providing coolant passages through said toolholder from the inner end of the extension thereof to a point closely adjacent the cutting tool mount thereon, and bore means in said base leading to a position communicating with the inner end of said toolholder extension lying in an operative position of said turret, whereby as the turret is indexed to bring said toolholder into an operative position the coolant is valved only to said toolholder in said operative position and coolant flow to said toolholder is shut off as the turret is indexed into other than an operative position of said toolholder.

8. A turret mechanism as defined in claim 1 including a plurality of toolholder bores in said turret, and at least one binder plug acting in conjuction with said plurality of toolholder bores.

9. A turret mechanism as defined in claim 1 including a plurality of toolholder bores in said turret, means on each toolholder to mount a tool thereon, means to supply coolant to said base, means providing coolant passages through each said toolholder from the inner end of the extension thereof to a point closely adjacent the cutting tool mount thereon, and bore means in said base leading to a position communicating with the inner end of each said toolholder extension lying in an operative position of said turret, whereby as the turret is indexed to bring said toolholder into an operative position the coolant is valved only to said toolholder in said operative position.

10. In a machine tool having a base, the combination of, means journaling a turret on said base on a first axis, a plurality of toolholder bores in said turret lying in a common plane normal to said axis, a face on said turret generally parallel to said common plane, a plurality of locking bores in said turret, said locking bores extending generally at right angles to the axes of said toolholder bores and extending from said face of the turret to intersect said toolholder bores but axially offset therefrom, a binder plug in each of said locking bores, said binder plugs having a second axis and a planar binder face disposed at an acute angle to said second axis, a toolholder having a generally cylindrical extension adapted to be received in any of said toolholder bores, a planar wedging face cutting off a portion of each of said cylindrical extensions and with each said planar wedging face parallel to the axis of the respective cylindrical extensions, said binder face adapted to engage said planar wedging face on the respective cylindrical extensions upon a toolholder being inserted in the respective toolholder bore, means engaging said turret and said binder plugs to fasten said binder plugs to said turret generally in a direction along said second axes to cause said binder face on a binder plug to positively engage said wedging face on said toolholder cylindrical extension to thus firmly lock said toolholder cylindrical extension axially in the respective toolholder bore of the turret and also to positively rotatively locate the toolholder cylindrical extension in the respective toolholder bore, means on each said toolholder to mount a cutting tool thereon, means to supply coolant to the base, means providing coolant passages through a plurality of said toolholders from the inner end of the cylindrical extension thereof to a point closely adjacent the cutting tool mount thereon, and bore means in the base leading to a position communicating with the inner end of a toolholder cylindrical extension lying in an operative position of said turret, whereby as the turret is indexed to bring individual toolholders into an operative position the coolant is valved only to the toolholder in said operative position.

References Cited
UNITED STATES PATENTS

| | | | |
|---|---|---|---|
| 481,193 | 8/1892 | Richards | 82—36 |
| 2,473,138 | 6/1949 | Darash | 29—35.5 |

LEONIDAS VLACHOS, *Primary Examiner.*